(12) United States Patent
Zhang et al.

(10) Patent No.: US 11,296,593 B2
(45) Date of Patent: Apr. 5, 2022

(54) NEUTRAL-POINT VOLTAGE BALANCE CONTROL METHOD AND SYSTEM FOR THREE-LEVEL CONVERTER IN FULL POWER FACTOR RANGE

(71) Applicant: SHANDONG UNIVERSITY, Shandong (CN)

(72) Inventors: Chenghui Zhang, Jinan (CN); Changwei Qin, Jinan (CN); Xiaoyan Li, Jinan (CN); Xiangyang Xing, Jinan (CN); Shunquan Hu, Jinan (CN); Ying Jiang, Jinan (CN); Alian Chen, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/260,461

(22) PCT Filed: Jun. 18, 2019

(86) PCT No.: PCT/CN2019/091773
§ 371 (c)(1),
(2) Date: Jan. 14, 2021

(87) PCT Pub. No.: WO2020/177238
PCT Pub. Date: Sep. 10, 2020

(65) Prior Publication Data
US 2021/0273551 A1    Sep. 2, 2021

(30) Foreign Application Priority Data
Mar. 6, 2019 (CN) .......................... 201910169260.4

(51) Int. Cl.
*H02M 1/12* (2006.01)
*H02M 7/5387* (2007.01)
(Continued)

(52) U.S. Cl.
CPC ............. *H02M 1/123* (2021.05); *H02M 1/44* (2013.01); *H02M 7/487* (2013.01); *H02M 7/53876* (2021.05)

(58) Field of Classification Search
CPC .... H02M 7/53876; H02M 7/487; H02M 1/12; H02M 1/44; H02M 1/123
See application file for complete search history.

(56) References Cited

U.S. PATENT DOCUMENTS 7,558,089 B2    7/2009   Mese et al.
9,871,436 B1 *  1/2018   Jiao ........................ H02M 7/487
(Continued)

FOREIGN PATENT DOCUMENTS

CN    104779826 A    7/2015
CN    204597799 U    8/2015
(Continued)

OTHER PUBLICATIONS

Dec. 12, 2019 Search Report issued in International Patent Application No. PCT/CN2019/091773.
(Continued)

*Primary Examiner* — Adolf D Berhane
(74) *Attorney, Agent, or Firm* — Oliff PLC

(57) ABSTRACT

A neutral-point voltage balance control method and system for a three-level converter in a full power factor range. The method includes: using a large, medium, and zero vector modulation method to synthesize a reference voltage vector, and duty cycles of a large vector, a medium vector, and a zero vector; obtaining a voltage difference between two dc-link capacitors of signal acquisition, and the voltage difference as a neutral-point potential of the three-level converter; according to a value relationship between the neutral-point potential of the three-level converter and a specified threshold, selecting a small vector and calculating
(Continued)

a duty cycle of the small vector; and updating a duty cycle of each basic vector, and obtaining a switching sequence for controlling a power switch of a three-phase bridge arm. An amplitude of a common-mode voltage of an NPC three-level converter is equal to one sixth of a dc-link voltage.

19 Claims, 3 Drawing Sheets

(51) Int. Cl.
*H02M 1/44* (2007.01)
*H02M 7/487* (2007.01)

(56) References Cited

U.S. PATENT DOCUMENTS

| | | | |
|---|---|---|---|
| 10,256,760 B2* | 4/2019 | Fukumaru | H02P 21/13 |
| 11,070,143 B2* | 7/2021 | Komiya | H02M 7/487 |
| 11,128,222 B2* | 9/2021 | Itogawa | H02M 3/33584 |

FOREIGN PATENT DOCUMENTS

| | | |
|---|---|---|
| CN | 106253647 A | 12/2016 |
| CN | 107196536 A | 9/2017 |
| CN | 109787498 A | 5/2019 |

OTHER PUBLICATIONS

Dec. 12, 2019 Written Opinion issued in International Patent Application No. PCT/CN2019/091773.

* cited by examiner

NEUTRAL-POINT VOLTAGE BALANCE CONTROL METHOD AND SYSTEM FOR THREE-LEVEL CONVERTER IN FULL POWER FACTOR RANGE

BACKGROUND

Technical Field

This disclosure relates to the technical field of common-mode voltage reduction for a three-level converter system, and in particular, to a neutral-point voltage balance control method and system for a three-level converter in a full power factor range.

Related Art

The statement in this part only provides background information related to this disclosure, and does not necessarily constitute the prior art.

In recent years, with the rapid development of high-power AC power drive technology, neutral-point-clamped (NPC) three-level converters have been widely used. Compared with a conventional three-phase two-level converter topology, the NPC three-level converter has advantages such as low voltage stress on power devices and good output waveform quality.

A common-mode voltage, which is generated by an on/off action of a power device in a converter, increases electromagnetic interference of the system, and brings serious harm to the safe, reliable, and stable operation of power electronics systems. In a photovoltaic power generation system, the common-mode voltage generates a common-mode leakage current, which seriously threatens personal safety. In a power drive system, a common-mode current generated by a common-mode voltage continuously flows through the electrical insulation of the motor, causing serious damage to the motor; and a bearing current is generated, damaging the bearing of the motor. These problems make common-mode voltage reduction become an issue that needs to be considered.

It is found by the inventor that existing common-mode voltage reduction methods are mainly for unity power factor or high power factor operation, and there are few researches on common-mode voltage reduction methods for an NPC three-level converter system in a full power factor range.

SUMMARY

This disclosure proposes a neutral-point voltage balance control method and system for a three-level converter in a full power factor range, to implement common-mode voltage reduction for an NPC three-level converter system at all power factors. In addition, low-frequency oscillation of a neutral-point potential is eliminated, and the neutral-point potential can be recovered when an exception causes the dc unbalance in neutral-point potential.

According to some embodiments, this disclosure uses the following technical solution:

a neutral-point voltage balance control method for a three-level converter in a full power factor range, including:

using a large, medium, and zero vector modulation method to synthesize a reference voltage vector, and respectively determining duty cycles of a large vector, a medium vector, and a zero vector;

obtaining a voltage difference between two dc-link capacitors by means of signal acquisition, and determining the voltage difference as a neutral-point potential of the three-level converter;

according to a value relationship between the neutral-point potential of the three-level converter and a specified threshold, selecting a small vector and calculating a duty cycle of the small vector; and updating a duty cycle of each basic vector, and obtaining a switching sequence for controlling a power switch of a three-phase bridge arm.

Further, the respectively determining duty cycles of a large vector, a medium vector, and a zero vector is specifically:

constructing a volt-second balance equation according to the large vector, the medium vector, the zero vector, and a relationship between their respective duty cycles and the reference voltage vector, and obtaining the duty cycles of the large vector, the medium vector, and the zero vector by solving the volt-second balance equation.

Further, the large vector, the medium vector, the zero vector, and the small vector are respectively selected as basic vectors, and there are six large vectors, six medium vectors, six small vectors, and one zero vector.

Further, when the neutral-point potential of the three-level converter is greater than the specified threshold, a PI controller is used to obtain the duty cycle of the selected small vector.

Further, when the neutral-point potential of the three-level converter is less than or equal to the specified threshold, the small vector is selected according to a sector in which the reference voltage vector locates and a situation of a three-phase output current; then, the duty cycle of each basic vector is updated, and the switching sequence is redesigned.

Further, when the reference voltage vector is in sector 1: if a phase B current is greater than 0 and a phase A current is greater than 0, or if a phase B current is less than 0 and a phase A current is less than 0, a large vector PNN, a medium vector PON, a small vector POO, and a zero vector OOO are selected to synthesize the reference voltage vector, and the switching sequence is designed as OOO-POO-PON-PNN-PON-POO-OOO. The volt-second balance equation is modified, and the duty cycle of each basic vector is updated. A value of the duty cycle of the small vector is further obtained by considering a constraint that the duty cycle of the small vector needs to meet.

Further, when the reference voltage vector is in sector 1: if a phase B current is greater than 0 and a phase C current is greater than 0, or if a phase B current is less than 0 and a phase C current is less than 0, a large vector PNN, a medium vector PON, a small vector OON, and a zero vector OOO are selected to synthesize the reference voltage vector, and the switching sequence is designed as OOO-OON-PON-PNN-PON-OON-OOO. The volt-second balance equation is modified, and the duty cycle of each basic vector is updated. A value of the duty cycle of the small vector is further obtained by considering a constraint that the duty cycle of the small vector needs to meet.

Further, when the reference voltage vector is in sector 1: if a phase B current is greater than 0 and both a phase A current and a phase C current are less than 0, or if a phase B current is less than 0 and both a phase A current and a phase C current are greater than 0, a large vector PNN, a medium vector PON, a small vector OPO, and a zero vector OOO are selected to synthesize the reference voltage vector, and the switching sequence is designed as OPO-OOO-PON-PNN-PON-OOO-OPO. The volt-second balance equation is modified, and the duty cycle of each basic vector is updated. A value of the duty cycle of the small vector is further obtained by considering a constraint that the duty cycle of the small vector needs to meet.

Further, when the reference voltage vector is in other sectors, a method similar to the method for sector 1 is used to determine the duty cycle of the small vector, and the determining is performed through analysis with reference to symmetry of a space vector diagram.

According to other embodiments, this disclosure uses the following solution:

a neutral-point voltage balance control system for a three-level converter in a full power factor range, including a controller and an algorithm program, where when executing the algorithm program, the controller implements the neutral-point voltage balance control method for a three-level converter in a full power factor range.

Compared with the prior art, this disclosure achieves the following beneficial effects:

(1) An amplitude of a common-mode voltage of an NPC three-level converter is equal to one sixth of a dc-link voltage. Compared with that in a conventional space vector modulation method, the amplitude of the common-mode voltage is reduced by half, so that electromagnetic interference of the system is reduced, and the adverse effect of the common-mode voltage on the motor winding is effectively reduced.

(2) In the method of the present invention, a sector and signs and value relationships of three-phase currents are considered, a basic voltage vector is selected, and a switching sequence is designed for each sector, so that low-frequency oscillation of a neutral-point potential can be eliminated in a full power factor range.

(3) The neutral-point potential can be recovered when an exception causes the dc unbalance in neutral-point potential.

(4) Because voltage oscillation of a dc-link capacitor is reduced, a capacitor with a relatively small capacity can be used, so that a volume of a whole converter system is reduced.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

DETAILED DESCRIPTION

It should be noted that, the following detailed descriptions are all exemplary, and are intended to provide further descriptions of this disclosure. Unless otherwise specified, all technical and scientific terms used herein have the same meaning as commonly understood by those of ordinary skill in the art to which this disclosure belongs.

It should be noted that terms used herein are only for the purpose of describing specific implementations and are not intended to limit the exemplary implementations of this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Embodiment 1

Figure 3:
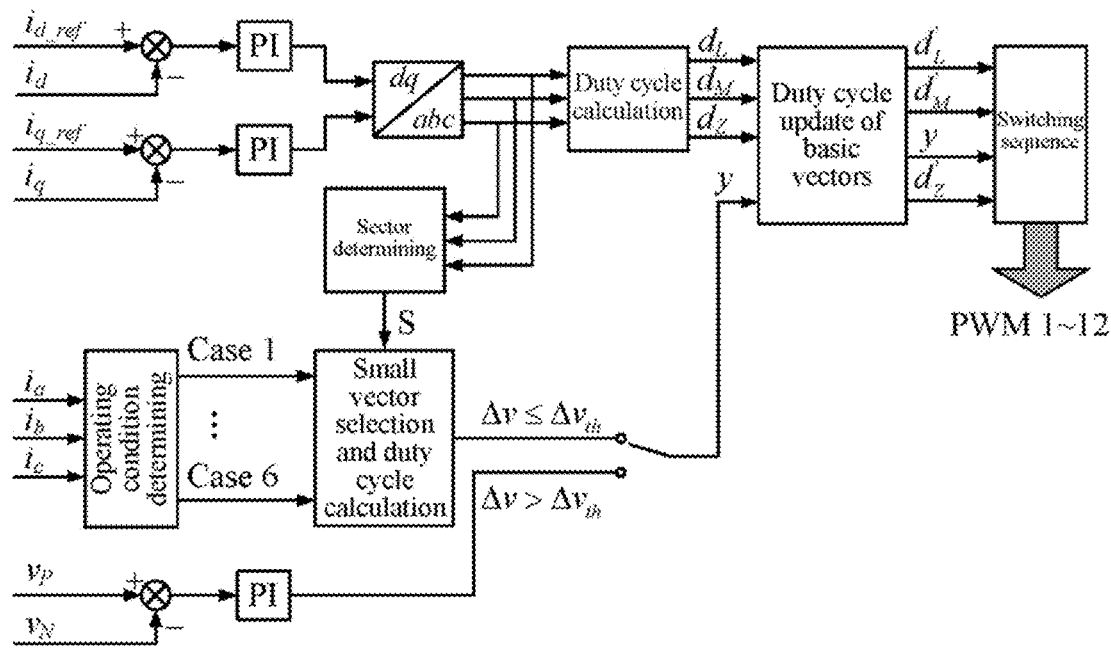
FIG. 3 is a control block diagram of the neutral-point voltage balance control method for a three-level converter in a full power factor range in Embodiment 1.

A neutral-point voltage balance control method for a three-level converter in a full power factor range is disclosed in one or more implementations. As shown in FIG. 3, the method includes the following steps:

(1) Use a large, medium, and zero vector modulation method to synthesize a reference voltage vector, and respectively determine duty cycles of a large vector, a medium vector, and a zero vector.

(2) Obtain a voltage difference between two dc-link capacitors by means of signal acquisition, and determine the voltage difference as a neutral-point potential of the three-level converter.

(3) According to a value relationship between the neutral-point potential of the three-level converter and a specified threshold, select a small vector and calculate a duty cycle of the small vector.

(4) Update a duty cycle of each basic vector, and obtain a switching sequence for controlling a power switch of a three-phase bridge arm.

Figure 1:
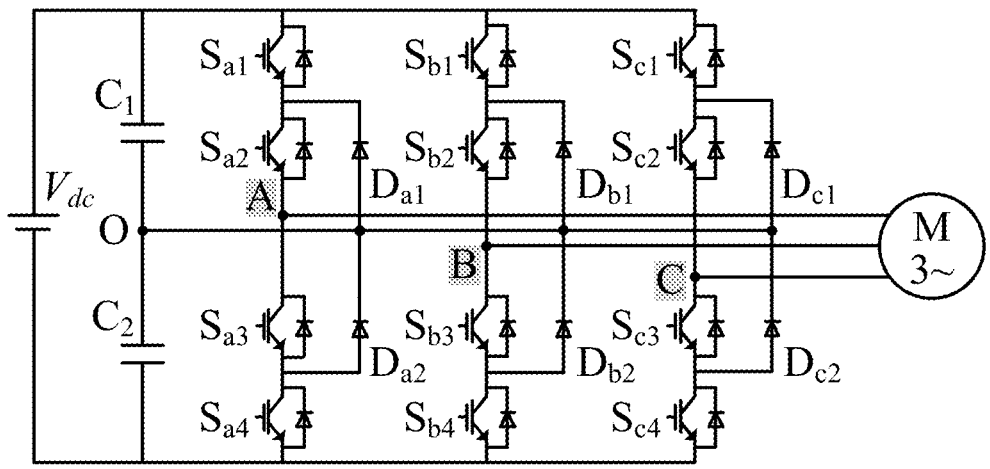
FIG. 1 is a topology of an NPC three-level converter system in Embodiment 1.

The method is mainly for an NPC three-level converter system. As shown in FIG. 1, the NPC three-level converter system includes a phase A bridge arm, a phase B bridge arm, and a phase C bridge arm, and each bridge arm includes four power switches and two clamping diodes. In the dc-link, there exist two filter capacitors connected in series, a neutral point is formed in the middle between the two filter capacitors, and the middle between the two clamping diodes of each bridge arm is connected to the neutral point.

It should be understood that the power switch is an insulated gate bipolar transistor (IGBT). Certainly, the power switch may also be implemented by using a transistor of another type.

Specifically, there are three working states P, O, and N for each bridge arm of the NPC three-level converter system. The neutral point of the two dc-link filter capacitors is used as a reference point. In the state P, an output voltage of the bridge arm is half of an output DC voltage value; in the state O, the output voltage of the bridge arm is zero; and in the state N, the output voltage of the bridge arm is negative half of the output DC voltage value.

Switch-on or switch-off of the power switch is completed by a control system.

Figure 2:
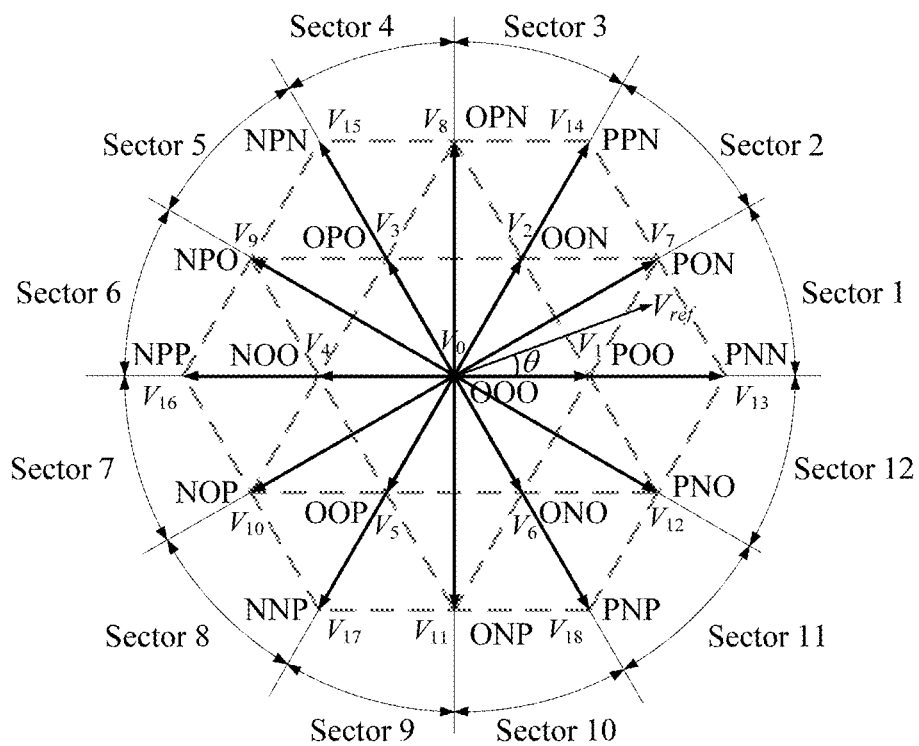
FIG. 2 is a space vector diagram of a neutral-point voltage balance control method for a three-level converter in a full power factor range in Embodiment 1.

In the method of the present invention, a new space vector modulation method is designed to control switch-on or switch-off of the power switch in the NPC three-level converter system, and a total of 19 basic vectors are used. According to different amplitudes, the basic vectors are classified into a large vector, a medium vector, a small vector, and a zero vector. FIG. 2 shows a space vector diagram.

Table 1 lists basic voltage vectors selected in the method of the present invention and corresponding common-mode voltage amplitudes.

A common-mode voltage is defined as an average value of three-phase output voltages of an NPC three-level converter.

$$v_{CM} = \frac{1}{3}(v_{AO} + v_{BO} + v_{CO}) \quad (1)$$

TABLE 1

Basic voltage vectors selected in the method of the present invention and corresponding common-mode voltage amplitudes

| Vector Class | | State | Common-mode Voltage | State | Common-mode Voltage | State | Common-mode Voltage |
|---|---|---|---|---|---|---|---|
| Large vector | | PNN | $-V_{dc}/6$ | PPN | $V_{dc}/6$ | NPN | $-V_{dc}/6$ |
| | | NPP | $V_{dc}/6$ | NNP | $-V_{dc}/6$ | PNP | $V_{dc}/6$ |
| Medium vector | | PON | 0 | OPN | 0 | NPO | 0 |
| | | NOP | 0 | ONP | 0 | PNO | 0 |
| Small vector | P-type | POO | $V_{dc}/6$ | OPO | $V_{dc}/6$ | OOP | $V_{dc}/6$ |
| | N-type | OON | $-V_{dc}/6$ | NOO | $-V_{dc}/6$ | ONO | $-V_{dc}/6$ |
| Zero vector | | OOO | 0 | — | — | — | — |

First, a large, medium, and zero vector modulation method is used to synthesize a reference voltage vector, and a volt-second balance equation is obtained.

$$\begin{cases} V_L d_L + V_M d_M + V_Z d_Z = V_{ref} \\ d_L + d_M + d_Z = 1 \end{cases} \quad (2)$$

$d_L$, $d_M$, and $d_Z$ are respectively duty cycles of the large vector, the medium vector, and the zero vector, and $V_{ref}$ is an amplitude of the reference voltage vector.

The volt-second balance equation is solved to obtain the duty cycles of the large vector, the medium vector, and the zero vector, which are respectively:

$$\begin{cases} d_L = \sqrt{3}\, m\, \sin\!\left(\frac{\pi}{6} - \theta\right) \\ d_M = 2m \sin \theta \\ d_Z = 1 - (d_L + d_M) \end{cases} \quad (3)$$

m is a modulation depth and is defined as $$m = \frac{\sqrt{3}\, V_{ref}}{V_{dc}}.$$

$V_{ref}$ is the amplitude of the reference voltage vector, and $V_{dc}$ is a DC input voltage.

A neutral-point potential of the NPC three-level converter is equal to a difference of two capacitor voltages, that is, $\Delta v = v_p - v_N$. A neutral-point potential threshold $\Delta v_{th}$ is set. When $\Delta v > \Delta v_{th}$, a PI controller is used to obtain a duty cycle of a selected small vector. Specifically, a voltage deviation of two dc-link capacitors is input to a PI controller, and an absolute value operation is performed for output of the PI controller, to obtain the duty cycle of the selected small vector. When $\Delta v \leq v_{th}$, the following steps are used to accurately calculate the duty cycle of the selected small vector.

To suppress low-frequency oscillation of the neutral-point potential, the small vector is selected according to a sector in which the reference voltage vector locates and a situation of a three-phase output current; then, the duty cycle of each basic vector is updated, and the switching sequence is redesigned. After the selection of the small vector, it is assumed that duty cycles of the large vector, the medium vector, the small vector, and the zero vector are respectively updated to $d'_L$, $d'_M$, $d'_S$, and $d'_Z$. $i_a$, $i_b$, and $i_c$ respectively represent a phase A output current, a phase B output current, and a phase C output current of the NPC three-level converter system. Implementation steps of the method of the present invention are analyzed by using an example in which the reference voltage vector is in sector 1. The implementation steps include the following six cases.

(1) When a phase B current is greater than 0 and a phase A current is greater than 0, a large vector PNN, a medium vector PON, a small vector POO, and a zero vector OOO are selected to synthesize the reference voltage vector, and the switching sequence is designed as OOO-POO-PON-PNN-PON-POO-OOO. The duty cycle of each basic vector is updated according to a modified volt-second balance equation.

$$\begin{cases} d'_L = d_L - \dfrac{y}{2} \\ d'_M = d_M \\ d'_S = y \\ d'_Z = d_Z - \dfrac{y}{2} \end{cases} \quad (4)$$

To eliminate low-frequency oscillation of the neutral-point potential, it is assumed that neutral-point potential fluctuation generated by the medium vector PON is equal to that generated by the small vector POO, that is, $$d_M i_b = y i_a \quad (5)$$

The following is obtained.

$$y = \frac{d_M i_b}{i_a} \quad (6)$$

A value of the duty cycle of the small vector is further obtained by considering a constraint that the duty cycle of the small vector needs to meet, and the value is:

$$0 < y = \min\!\left\{\frac{d_M i_b}{i_a},\, 2d_L,\, 2d_Z\right\} \quad (7)$$

(2) When a phase B current is greater than 0 and a phase C current is greater than 0, a large vector PNN, a medium vector PON, a small vector OON, and a zero vector OOO are selected to synthesize the reference voltage vector, and the switching sequence is designed as OOO-OON-PON-PNN-PON-OON-OOO. The duty cycle of each basic vector is updated according to a modified volt-second balance equation.

$$\begin{cases} d'_L = d_L + \frac{y}{2} \\ d'_M = d_M - y \\ d'_S = y \\ d'_Z = d_Z - \frac{y}{2} \end{cases} \quad (8)$$

To eliminate low-frequency oscillation of the neutral-point potential, it is assumed that neutral-point potential fluctuation generated by the medium vector PON is equal to that generated by the small vector OON, that is, $$(d_M - y)i_b = yi_c \quad (9)$$

The following is obtained.

$$y = \frac{d_M i_b}{i_b + i_c} \quad (10)$$

A value of the duty cycle of the small vector is further obtained by considering a constraint that the duty cycle of the small vector needs to meet, and the value is:

$$0 < y = \min\left\{\frac{d_M i_b}{i_b + i_c}, 2d_Z\right\} \quad (11)$$

(3) When a phase B current is greater than 0 and both a phase A current and a phase C current are less than 0, a large vector PNN, a medium vector PON, a small vector OPO, and a zero vector OOO are selected to synthesize the reference voltage vector, and the switching sequence is designed as OPO-OOO-PON-PNN-PON-OOO-OPO. The duty cycle of each basic vector is updated according to a modified volt-second balance equation.

$$\begin{cases} d'_L = d_L + y \\ d'_M = d_M - y \\ d'_S = y \\ d'_Z = d_Z - y \end{cases} \quad (12)$$

To eliminate low-frequency oscillation of the neutral-point potential, it is assumed that neutral-point potential fluctuation generated by the medium vector PON is equal to that generated by the small vector OPO, that is, $$(d_M - y)i_b = yi_b \quad (13)$$

The following is obtained.

$$y = \frac{d_M}{2} \quad (14)$$

A value of the duty cycle of the small vector is further obtained by considering a constraint that the duty cycle of the small vector needs to meet, and the value is:

$$0 < y = \min\left\{\frac{d_M}{2}, 2d_Z\right\} \quad (15)$$

(4) When a phase B current is less than 0 and a phase A current is less than 0, selection of basic voltage vectors, duty cycle update, and switching sequence design are the same as those in case (1).

(5) When a phase B current is less than 0 and a phase C current is less than 0, selection of basic voltage vectors, duty cycle update, and switching sequence design are the same as those in case (2).

(6) When a phase B current is less than 0 and both a phase A current and a phase C current are greater than 0, selection of basic voltage vectors, duty cycle update, and switching sequence design are the same as those in case (3).

When the reference voltage vector is in other sectors, a method similar to the method for sector 1 can be used, and analysis is performed with reference to symmetry of a space vector diagram.

Figure 4:
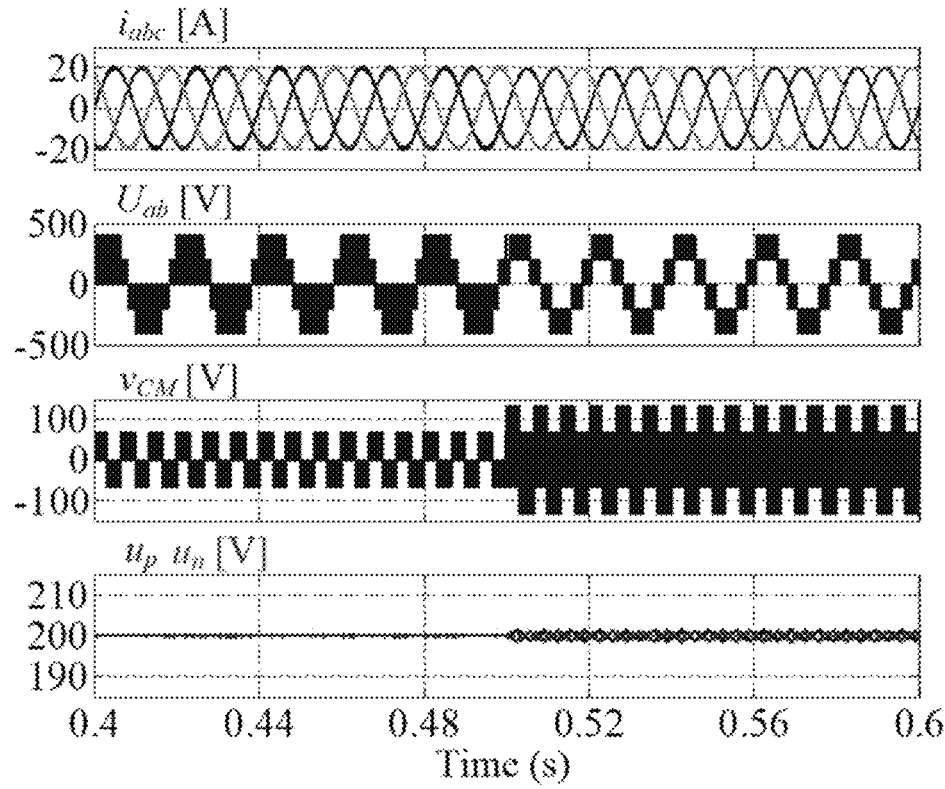
FIG. 4 is simulation waveforms of the proposed method and conventional space voltage vector modulation when power factor PF=1 in Embodiment 1, where the simulation waveforms are respectively for three-phase currents, a line voltage, a common-mode voltage, and upper and lower dc-link capacitor voltages from top to bottom.
Figure 5:
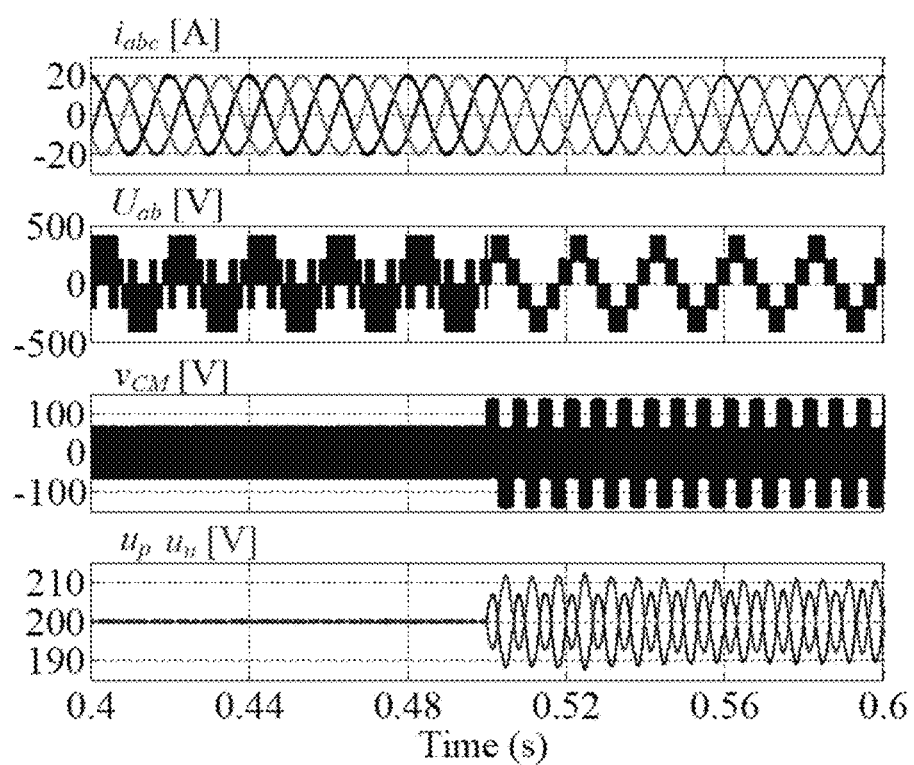
FIG. 5 is simulation waveforms of the proposed method and conventional space voltage vector modulation when power factor PF=0 in Embodiment 1, where the simulation waveforms are respectively for three-phase currents, a line voltage, a common-mode voltage, and upper and lower dc-link capacitor voltages from top to bottom.

FIG. 4 and FIG. 5 are simulation waveforms of the proposed method and conventional space voltage vector modulation when power factor PF=1 and PF=0 respectively, where the simulation waveforms are respectively for three-phase currents, a line voltage, a common-mode voltage, and upper and lower dc-link capacitor voltages from top to bottom. When time t<0.5 s, the proposed method is used. When t>0.5 s, the conventional space vector modulation method is used. It can be seen that a sinusoidal degree of a three-phase current is similar in the two methods, and a line voltage includes five levels in these two methods. However, a common-mode voltage in the proposed method is only half of that in the conventional method, so that an amplitude of the common-mode voltage is effectively reduced. In addition, neutral-point potential fluctuation is effectively suppressed in the proposed method, compared with the conventional method. Especially when PF=0, neutral-point potential fluctuation in the conventional method is greater than 10V, but the neutral-point potential fluctuation of the proposed method is effectively reduced.

Embodiment 2

A neutral-point voltage balance control system for a three-level converter in a full power factor range is disclosed in one or more implementations. The system includes a controller and an algorithm program. When executing the algorithm program, the controller implements the neutral-point voltage balance control method for a three-level converter in a full power factor range in Embodiment 1.

The foregoing specific implementations of this disclosure are described with reference to the accompanying drawings, but are not intended to limit the protection scope of this disclosure. A person skilled in the art should understand that various modifications or variations may be made without creative efforts based on the technical solutions of this disclosure, and such modifications or variations shall fall within the protection scope of this disclosure.

What is claimed is:

1. A neutral-point voltage balance control method for a three-level converter in a full power factor range, comprising:
using a large, medium, and zero vector modulation method to synthesize a reference voltage vector, and respectively determining duty cycles of a large vector, a medium vector, and a zero vector;
obtaining a voltage difference between two dc-link capacitors by means of signal acquisition, and determining the voltage difference as a neutral-point potential of the three-level converter;

according to a value relationship between the neutral-point potential of the three-level converter and a specified threshold, selecting a small vector and calculating a duty cycle of the small vector; and updating a duty cycle of each basic vector, and obtaining a switching sequence for controlling a power switch of a three-phase bridge arm.

2. The neutral-point voltage balance control method for a three-level converter in a full power factor range according to claim 1, wherein the respectively determining duty cycles of a large vector, a medium vector, and a zero vector is specifically:

constructing a volt-second balance equation according to the large vector, the medium vector, the zero vector, and a relationship between their respective duty cycles and the reference voltage vector, and obtaining the duty cycles of the large vector, the medium vector, and the zero vector by solving the volt-second balance equation.

3. The neutral-point voltage balance control method for a three-level converter in a full power factor range according to claim 1, wherein the large vector, the medium vector, the zero vector, and the small vector are respectively selected as basic vectors, and there are six large vectors, six medium vectors, six small vectors, and one zero vector.

4. The neutral-point voltage balance control method for a three-level converter in a full power factor range according to claim 1, wherein when the neutral-point potential of the three-level converter is greater than the specified threshold, a PI controller is used to obtain the duty cycle of the selected small vector.

5. The neutral-point voltage balance control method for a three-level converter in a full power factor range according to claim 1, wherein when the neutral-point potential of the three-level converter is less than or equal to the specified threshold, the small vector is selected according to a sector in which the reference voltage vector locates and a situation of a three-phase output current; then, the duty cycle of each basic vector is updated, and the switching sequence is redesigned.

6. The neutral-point voltage balance control method for a three-level converter in a full power factor range according to claim 5, wherein when the reference voltage vector is in sector 1: if a phase B current is greater than 0 and a phase A current is greater than 0, or if a phase B current is less than 0 and a phase A current is less than 0, a large vector PNN, a medium vector PON, a small vector POO, and a zero vector OOO are selected to synthesize the reference voltage vector, and the switching sequence is designed as OOO-POO-PON-PNN-PON-POO-OOO.

7. The neutral-point voltage balance control method for a three-level converter in a full power factor range according to claim 5, wherein when the reference voltage vector is in sector 1: if a phase B current is greater than 0 and a phase C current is greater than 0, or if a phase B current is less than 0 and a phase C current is less than 0, a large vector PNN, a medium vector PON, a small vector OON, and a zero vector OOO are selected to synthesize the reference voltage vector, and the switching sequence is designed as OOO-OON-PON-PNN-PON-OON-OOO.

8. The neutral-point voltage balance control method for a three-level converter in a full power factor range according to claim 5, wherein when the reference voltage vector is in sector 1: if a phase B current is greater than 0 and both a phase A current and a phase C current are less than 0, or if a phase B current is less than 0 and both a phase A current and a phase C current are greater than 0, a large vector PNN, a medium vector PON, a small vector OPO, and a zero vector OOO are selected to synthesize the reference voltage vector, and the switching sequence is designed as OPO-OOO-PON-PNN-PON-OOO-OPO.

9. The neutral-point voltage balance control method for a three-level converter in a full power factor range according to claim 6, wherein when the reference voltage vector is in other sectors, a method similar to the method for sector 1 is used to determine the duty cycle of the small vector, and the determining is performed through analysis with reference to symmetry of a space vector diagram.

10. A neutral-point voltage balance control system for a three-level converter in a full power factor range, comprising a server, wherein the server comprises a memory, a processor, and a computer program that is stored in the memory and that can run on the processor, and when executing the program, the processor implements the neutral-point voltage balance control method for a three-level converter in a full power factor range according to claim 1.

11. The neutral-point voltage balance control method for a three-level converter in a full power factor range according to claim 7, wherein when the reference voltage vector is in other sectors, a method similar to the method for sector 1 is used to determine the duty cycle of the small vector, and the determining is performed through analysis with reference to symmetry of a space vector diagram.

12. The neutral-point voltage balance control method for a three-level converter in a full power factor range according to claim 8, wherein when the reference voltage vector is in other sectors, a method similar to the method for sector 1 is used to determine the duty cycle of the small vector, and the determining is performed through analysis with reference to symmetry of a space vector diagram.

13. A neutral-point voltage balance control system for a three-level converter in a full power factor range, comprising a server, wherein the server comprises a memory, a processor, and a computer program that is stored in the memory and that can run on the processor, and when executing the program, the processor implements the neutral-point voltage balance control method for a three-level converter in a full power factor range according to claim 2.

14. A neutral-point voltage balance control system for a three-level converter in a full power factor range, comprising a server, wherein the server comprises a memory, a processor, and a computer program that is stored in the memory and that can run on the processor, and when executing the program, the processor implements the neutral-point voltage balance control method for a three-level converter in a full power factor range according to claim 3.

15. A neutral-point voltage balance control system for a three-level converter in a full power factor range, comprising a server, wherein the server comprises a memory, a processor, and a computer program that is stored in the memory and that can run on the processor, and when executing the program, the processor implements the neutral-point voltage balance control method for a three-level converter in a full power factor range according to claim 4.

16. A neutral-point voltage balance control system for a three-level converter in a full power factor range, comprising a server, wherein the server comprises a memory, a processor, and a computer program that is stored in the memory and that can run on the processor, and when executing the program, the processor implements the neutral-point voltage balance control method for a three-level converter in a full power factor range according to claim 5.

17. A neutral-point voltage balance control system for a three-level converter in a full power factor range, comprising a server, wherein the server comprises a memory, a processor, and a computer program that is stored in the memory and that can run on the processor, and when executing the program, the processor implements the neutral-point voltage balance control method for a three-level converter in a full power factor range according to claim 6.

18. A neutral-point voltage balance control system for a three-level converter in a full power factor range, comprising a server, wherein the server comprises a memory, a processor, and a computer program that is stored in the memory and that can run on the processor, and when executing the program, the processor implements the neutral-point voltage balance control method for a three-level converter in a full power factor range according to claim 7.

19. A neutral-point voltage balance control system for a three-level converter in a full power factor range, comprising a server, wherein the server comprises a memory, a processor, and a computer program that is stored in the memory and that can run on the processor, and when executing the program, the processor implements the neutral-point voltage balance control method for a three-level converter in a full power factor range according to claim 8.

* * * * *